(12) United States Patent
Fu

(10) Patent No.: US 12,510,761 B2
(45) Date of Patent: Dec. 30, 2025

(54) STEREOSCOPIC PROJECTION DEVICE COMPRISING A 3D LIGHT VALVE ROTATIONALLY INSTALLED ON A LIGHT-EMITTING SIDE OF A LENS ASSEMBLY

(71) Applicant: CINEAPPO LASER CINEMA TECHNOLOGY (BEIJING) CO., LTD, Beijing (CN)

(72) Inventor: Wei Fu, Beijing (CN)

(73) Assignee: CINEAPPO LASER CINEMA TECHNOLOGY (BEIJING) CO., LTD, Beijing (CN)

( * ) Notice: Subject to any disclaimer, the term of this patent is extended or adjusted under 35 U.S.C. 154(b) by 295 days.

(21) Appl. No.: 18/290,147

(22) PCT Filed: May 12, 2022

(86) PCT No.: PCT/CN2022/092389
§ 371 (c)(1),
(2) Date: Nov. 9, 2023

(87) PCT Pub. No.: WO2022/237862
PCT Pub. Date: Nov. 17, 2022

(65) Prior Publication Data
US 2024/0264461 A1  Aug. 8, 2024

(30) Foreign Application Priority Data

May 12, 2021  (CN) .......................... 202110518734.9
May 12, 2021  (CN) .......................... 202121011210.2

(51) Int. Cl.
*G02B 30/25* (2020.01)
(52) U.S. Cl.
CPC .................................. *G02B 30/25* (2020.01)

(58) Field of Classification Search
CPC ............................... G03B 35/26; G02B 6/2773
See application file for complete search history.

(56) References Cited

U.S. PATENT DOCUMENTS

| | | | |
|---|---|---|---|
| 2011/0096383 A1 | 4/2011 | Nomoto et al. | |
| 2011/0304614 A1* | 12/2011 | Yasunaga ............... | H04N 13/31 345/419 |
| 2013/0141552 A1* | 6/2013 | Kwon .................... | G02B 30/25 348/54 |

FOREIGN PATENT DOCUMENTS

| | | |
|---|---|---|
| CN | 102572347 A | 7/2012 |
| CN | 106773479 A | 5/2017 |

(Continued)

OTHER PUBLICATIONS

Chinese Office Action for Application No. or Publication No. 202110518734.9 dated Mar. 8, 2025.

*Primary Examiner* — Paul C Lee
(74) *Attorney, Agent, or Firm* — Howard & Howard Attorneys PLLC

(57) ABSTRACT

A stereoscopic projection device is provided, including a projector including includes a lens assembly for emitting partially polarized light and polarization stereoscopic conversion equipment including a 3D light valve which is rotationally installed to a light-emitting side of the lens assembly and is parallel to the lens assembly, such that the partially polarized light passes through the 3D light valve to be converted into left hand circularly polarized light and right hand circularly polarized light. When the partially polarized light is subjected to light spot offset, the 3D light valve is rotationally regulated according to polarization characteristics of the partially polarized light and rotational symmetry of the light valve and has the same effect on the light polarization before and after being rotated, the 3D light valve is enabled to cover the current light spot range formed (Continued)

at the 3D light valve by the light emitted from the lens assembly.

20 Claims, 16 Drawing Sheets

(56) References Cited

FOREIGN PATENT DOCUMENTS

| CN | 111505895 A | * | 8/2020 | ........... G03B 21/145 |
| CN | 113009770 A | | 6/2021 | |
| CN | 113433789 A | | 9/2021 | |

\* cited by examiner

STEREOSCOPIC PROJECTION DEVICE COMPRISING A 3D LIGHT VALVE ROTATIONALLY INSTALLED ON A LIGHT-EMITTING SIDE OF A LENS ASSEMBLY

CROSS-REFERENCE TO RELATED APPLICATION

This present application claims the priority of Chinese Patent Application No. 202110518734.9 filed with the China National Intellectual Property Administration on May 12, 2021, entitled "Stereoscopic projection device" and the priority of Chinese Patent Application No. 202121011210.2 filed with the China National Intellectual Property Administration on May 12, 2021, entitled "Stereoscopic projection device", the disclosures of which are incorporated by reference herein in their entireties as part of the present application.

TECHNICAL FIELD

The present disclosure belongs to the field of 3D projection, and in particular relates to stereoscopic projection device.

BACKGROUND

This section is intended to provide background or context for the embodiments of the present disclosure as set forth in the claims. The descriptions herein are not admitted to be prior art by virtue of their inclusion in this section.

With the development of the 3D projection technology in the cinema and other projection industries, stereoscopic projection system has become a widely used mainstream 3D projection technology. In accordance with the stereoscopic projection system, the light emitted by the projector is converted into left or right hand circularly polarized light for 3D projection after passing through a 3D light valve, and then 3D patterns are generated in human eyes by means of 3D glasses.

In the stereoscopic projection system in the prior art, the certain displacement margin of the light spot formed at the light valve by light emitted by the projector near the central of the light valve needs to be compatible. For example, for an ideal rectangular light spot having a length of L and a width of W, it is required that the displacement range of the ideal rectangular light spot in a width direction is $\pm K_1 W$, and the displacement range of the ideal rectangular light spot in a length direction is $\pm K_2 L$, and to satisfy the above displacement ranges, the minimum physical dimension of the 3D light valve is $(1+2K_2)L$ in length and $(1+2K_1)W$ in width, i.e., the area is $S=(1+2K_2)(1+2K_1)LW$.

Therefore, the stereoscopic projection system in the prior art has the defects of a large area of the 3D light valve and high cost.

SUMMARY

For the problems in the prior art, a stereoscopic projection device is provided, which can be used for solving the problems above.

The present disclosure provides the following solutions.

A stereoscopic projection device includes a projector and a polarization stereoscopic conversion equipment. The projector includes a lens assembly for emitting partially polarized light; and the polarization stereoscopic conversion equipment includes a 3D light valve, wherein the 3D light valve is rotationally installed on a light-emitting side of the lens assembly and is parallel to the lens assembly, such that the partially polarized light can pass through the 3D light valve to be converted into left hand circularly polarized light and right hand circularly polarized light. When the partially polarized light emitted by the lens assembly is subjected to light spot offset, the 3D light valve is rotationally regulated according to an offset position of the partially polarized light such that the 3D light valve covers a current light spot range formed at the 3D light valve by the partially polarized light.

In a possible embodiment, the partially polarized light emitted by the lens assembly forms a rectangular light spot having a length of L and a width of W at the 3D light valve, an offset range of the rectangular light spot is $\pm K_1 W$ in a width direction and $\pm K_2 L$ in a length direction, wherein $K_1$ is a width displacement coefficient, and $K_2$ is a length displacement coefficient. Moreover, a central zero-degree light of the lens assembly forms a central point at the 3D light valve, and the 3D light valve is rotated around the central point such that the 3D light valve covers a current light spot range of the rectangular light spot.

In a possible embodiment, if a first preset condition is satisfied, the 3D light valve is configured to at least include a square light valve MNPQ. When the rectangular light spot is offset, the 3D light valve is rotated around the central point by integral times of 90 degrees according to an offset position of the rectangular light spot such that the 3D light valve completely covers the current light spot range of the rectangular light spot, wherein a side length of the square light valve MNPQ is $\text{Max}[(\frac{1}{2}+K_2)L, (\frac{1}{2}+K_1)W]+\frac{1}{2}L$, one group of two adjacent sides of the square light valve MNPQ has a vertical distance of $\frac{1}{2}L$ from the central point, and another group of two adjacent sides of the square light valve MNPQ has a vertical distance of $\text{Max}[(\frac{1}{2}+K_2)L, (\frac{1}{2}+K_1)W]$ from the central point.

In a possible embodiment, if a second preset condition is satisfied, the 3D light valve is configured to at least include a rectangular light valve M'N'P'Q'. When the rectangular light spot is offset, the 3D light valve is rotated around the central point by integral times of 180 degrees according to the offset positions of the rectangular light spot such that the 3D light valve completely covers the current light spot range of the rectangular light spot.

In a possible embodiment, when $K_1 \geq K_2$, the rectangular light valve M'N'P'Q' has a length of $(1+2K_2)L$ and a width of $(1+K_1)W$, and a first long side and a second long side which are opposite to each other respectively have vertical distances of $\frac{1}{2}W$ and $(\frac{1}{2}+K_1)W$ from the central point, and a first short side and a second short side which are opposite to each other have a same vertical distance from the central point.

In a possible embodiment, when $K_1 \leq K_2$, the rectangular light valve M'N'P'Q' has a length of $(1+2K_1)W$ and a width of $(1+K_2)L$, and the first long side and the second long side which are opposite to each other respectively have vertical distances of $\frac{1}{2}L$ and $(\frac{1}{2}+K_2)L$ from the central point, and the first short side and the second short side which are opposite to each other have a same vertical distance from the central point.

In a possible embodiment, the first preset condition includes: the partially polarized light is partially circularly polarized light, and an area of the square light valve MNPQ is smaller than that of the rectangular light valve M'N'P'Q'. The second preset condition includes: the partially polarized light is partially circularly polarized light or partially linearly polarized light, and the area of the square light valve MNPQ is greater than that of the rectangular light valve M'N'P'Q'.

In a possible embodiment, the polarization stereoscopic conversion equipment further includes a light spot detection device for detecting the current light spot range formed at the 3D light valve by the partially polarized light; a rotating control device for controlling an angle of rotation of the 3D light valve in response to the detected current light spot range. In a possible embodiment, the light spot detection device is configured to detect a position of a light spot central point formed at the 3D light valve by the partially polarized light in a reference coordinate system XOY, wherein an origin O of the reference coordinate system XOY is the central point, an X-axis is parallel to a length direction of the light spot, and a Y-axis is parallel to a width direction of the light spot.

In a possible embodiment, when the 3D light valve is configured to at least include the square light valve MNPQ, the rotating control device is configured to control the 3D light valve to rotate by integral times of 90 degrees according to the position of the light spot central point in the reference coordinate system XOY, such that a central point of the square light valve MNPQ and a current light spot central point locate on a same quadrant of the reference coordinate system XOY.

In a possible embodiment, when the 3D light valve is configured to at least include the rectangular light valve M'N'P'Q' and $K_1 \geq K_2$, the rotating control device is configured to control the 3D light valve to rotate by integral times of 180 degrees according to the position of the light spot central point in the reference coordinate system XOY, such that the central point of the rectangular light valve M'N'P'Q' and the current light spot central point locate on a same side of the X-axis of the reference coordinate system XOY.

In a possible embodiment, when the 3D light valve is configured to at least include the rectangular light valve M'N'P'Q' and $K_1 \leq K_2$, the rotating control device is configured to control the 3D light valve to rotate by integral times of 180 degrees according to the position of the light spot central point in the reference coordinate system XOY, such that the central point of the rectangular light valve M'N'P'Q' and the current light spot central point located on a same side of the Y axis of the reference coordinate system XOY.

In a possible embodiment, the 3D light valve is a single-optical-path light valve.

In a possible embodiment, the polarization stereoscopic conversion equipment further includes a light valve housing. The light valve housing is rotationally installed at a light-emitting end of the projector, the 3D light valve is fixedly arranged on the light valve housing and is rotationally regulated under driving of the light valve housing. The light valve housing is provided with a plurality of installation fixing positions, and the light valve housing is configured to drive the 3D light valve to rotate to corresponding angles through the plurality of installation fixing positions.

At least one technical solution above employed by the embodiments of the present disclosure may achieve the following beneficial effects: as the 3D light valve in the technical solution provided by the embodiment has a rotational regulation function, its dimension may be smaller than the maximum light spot offset range possibly formed at the 3D light valve by the partially polarized light, and is only required to cover the current light spot range currently formed by partially polarized light at the 3D light valve after being rotated, thus reducing the area of the light valve, reducing the weight of the light valve, and reducing the cost of the stereoscopic projection device.

It should be understood that the above description is only an outline of the technical solutions of the present disclosure such that the technical means of the present disclosure can be more clearly understood and thus can be implemented according to the contents of the description. To make the above and other objects, features and advantages of the present disclosure more apparent, the specific embodiments of the present disclosure are illustrated below.

BRIEF DESCRIPTION OF THE DRAWINGS

The advantages and benefits described herein, as well as others, will be apparent to those of ordinary skill in the art upon reading the following detailed description of the exemplary embodiments. The drawings are only for the purpose of illustrating exemplary embodiments rather than limiting the present disclosure. Moreover, like reference numerals refer to like parts throughout the accompanying drawings. In the accompanying drawings.

In the accompanying drawings, like or corresponding reference numerals refer to like or corresponding parts.

DETAILED DESCRIPTION OF THE EMBODIMENTS

Exemplary embodiments of the present disclosure will be described below in more detail with reference to the accompanying drawings. Although the exemplary embodiments of the present disclosure are shown in the accompanying drawings, it should be understood that the present disclosure can be implemented in various forms and should not be limited by the embodiments set forth herein. On the contrary, these embodiments are provided to enable a thorough understanding of the present disclosure, and to fully convey the scope of the present disclosure to those skilled in the art.

In the present disclosure, it should be understood that the terms, such as 'include' or 'have', are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

In addition, it also needs to be noted that embodiments in the present disclosure and the features in the embodiments can be combined with each other without conflict. The present disclosure will be described in detail below with reference to the accompanying drawings and in conjunction with the embodiments.

Figure 1:
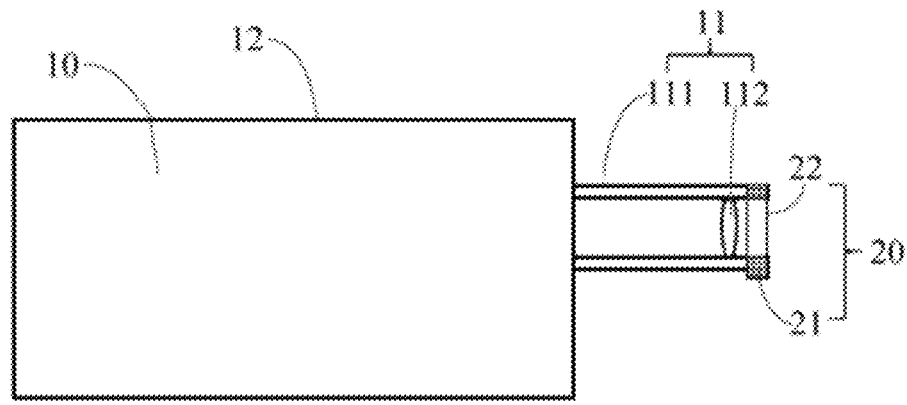
FIG. 1 illustrates a structure diagram of a stereoscopic projection device in accordance with an embodiment of the present disclosure.

FIG. 1 is a structure diagram of a stereoscopic projection device 10 in accordance with an embodiment of the present disclosure.

As shown in FIG. 1, the device 10 includes a projector 11 and a polarization stereoscopic conversion equipment 12. The projector 11 includes a lens assembly 111 for emitting partially polarized light; and the polarization stereoscopic conversion equipment 12 includes a 3D light valve 121, where the 3D light valve 121 is rotationally installed to a light-emitting side of the lens assembly 111 and is parallel to the lens assembly 111, such that the partially polarized light can pass through the 3D light valve to be converted into left hand circularly polarized light and right hand circularly polarized light. When the partially polarized light emitted by the lens assembly is subjected to light spot offset, the 3D light valve is rotationally regulated according to polarization states of the partially polarized light such that the 3D light valve covers the current light spot range formed at the 3D light valve by the partially polarized light. Moreover, the 3D light valve is rotationally regulated according to a polarization state of the partially polarized light such that the light valve has the same optical effect on the emitting polarized light within an error range before and after being rotated.

Figure 2:
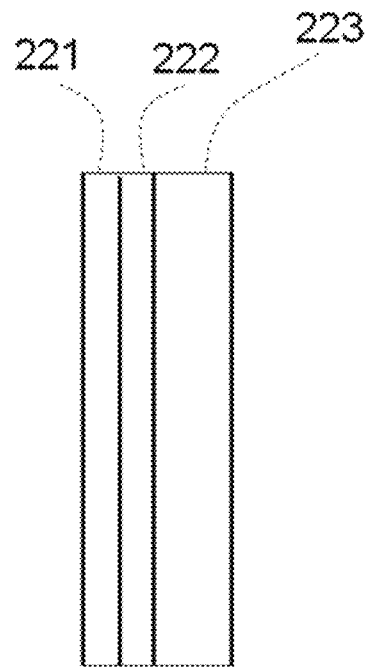
FIG. 2 illustrates a structure diagram of a 3D light valve in accordance with an embodiment of the present disclosure.

Compared with the prior art, as the 3D light valve in the technical solution provided by the embodiment has a rotational regulation function, its dimension may be smaller than the maximum light spot offset range possibly formed at the 3D light valve by the partially polarized light, and is only required to cover the current light spot range currently formed by partially polarized light at the 3D light valve after being rotated, thus reducing the area of the light valve, reducing the weight of the light valve, and reducing the cost of the stereoscopic projection device. Moreover, the light valve has the same optical effect on the emitting polarized light within an error range before and after being rotated, such that the area of the light valve can be reduced on the premise of guaranteeing the optical effect, and the cost of the stereoscopic projection device is reduced. It should be understood that, referring to FIG. 2, the 3D light valve in the embodiment of the present disclosure may include a phase retarder 221, a linear polarizer 222, and a liquid crystal phase retarder set 223. Due to the fact that a polarization direction of the polarized light and a polarization direction of a light valve waveplate have rotational symmetry, i.e., the light valve has approximately the same optical effect on the emitted light when rotated by a certain angle (e.g., 90 degrees, 180 degrees, 360 degrees, etc.) as when not rotated, such approximately the same means that the optical effect is same within the error range.

In a possible embodiment, the partially polarized light emitted by the lens assembly 111 forms a rectangular light spot having a length of L and a width of W at the 3D light valve 121, the offset range of the rectangular light spot is $\pm K_1 W$ in a width direction and $\#K_2 L$ in a length direction, where $K_1$ is a width displacement coefficient, and $K_2$ is a length displacement coefficient. Moreover, a central zero-degree light of the lens assembly forms a central point at the 3D light valve, and the 3D light valve is rotated around the central point such that the 3D light valve covers the current light spot range of the rectangular light spot.

According to the rotational symmetry of the polarization direction of the polarized light and the polarization direction of the light valve waveplate, for an ideal rectangular light spot having a length of L and a width of W, the area of the 3D light valve may be set to be smaller than the area $(1+2K_2)(1+2K_1)LW$ of the maximum light spot offset range, thus guaranteeing that the 3D light valve can completely cover all possible positions of the rectangular light spot within the offset range with the area $(1+2K_2)(1+2K_1)LW$.

Referring to FIG. 3A to FIG. 3E, the partially polarized light emitted by the lens assembly 111 forms a rectangular light spot abcd having a length of L and a width of W at the 3D light valve, the maximum light spot offset range formed by the possible offset of the rectangular light spot abcd is ABCD. A central zero-degree light of the lens assembly forms a central point O at the 3D light valve, and a reference coordinate system XOY is provided by taking the point O as the center. In the reference coordinate system XOY, the X-axis is parallel to a length direction of the light spot, and the Y-axis is parallel to a width direction of the light spot. In the maximum light spot offset range ABCD, the coordinate of a point A may be $(-(\frac{1}{2}+K_2)L, (\frac{1}{2}+K_1)W)$, the coordinate of a point B may be $((\frac{1}{2}+K_2)L, (\frac{1}{2}+K_1)W)$, the coordinate of a point C may be $((\frac{1}{2}+K_2)L, -(\frac{1}{2}+K_1)W)$, and the coordinate of a point D may be $(-(\frac{1}{2}+K_2)L, -(\frac{1}{2}+K_1)W)$.

Figure 3A:
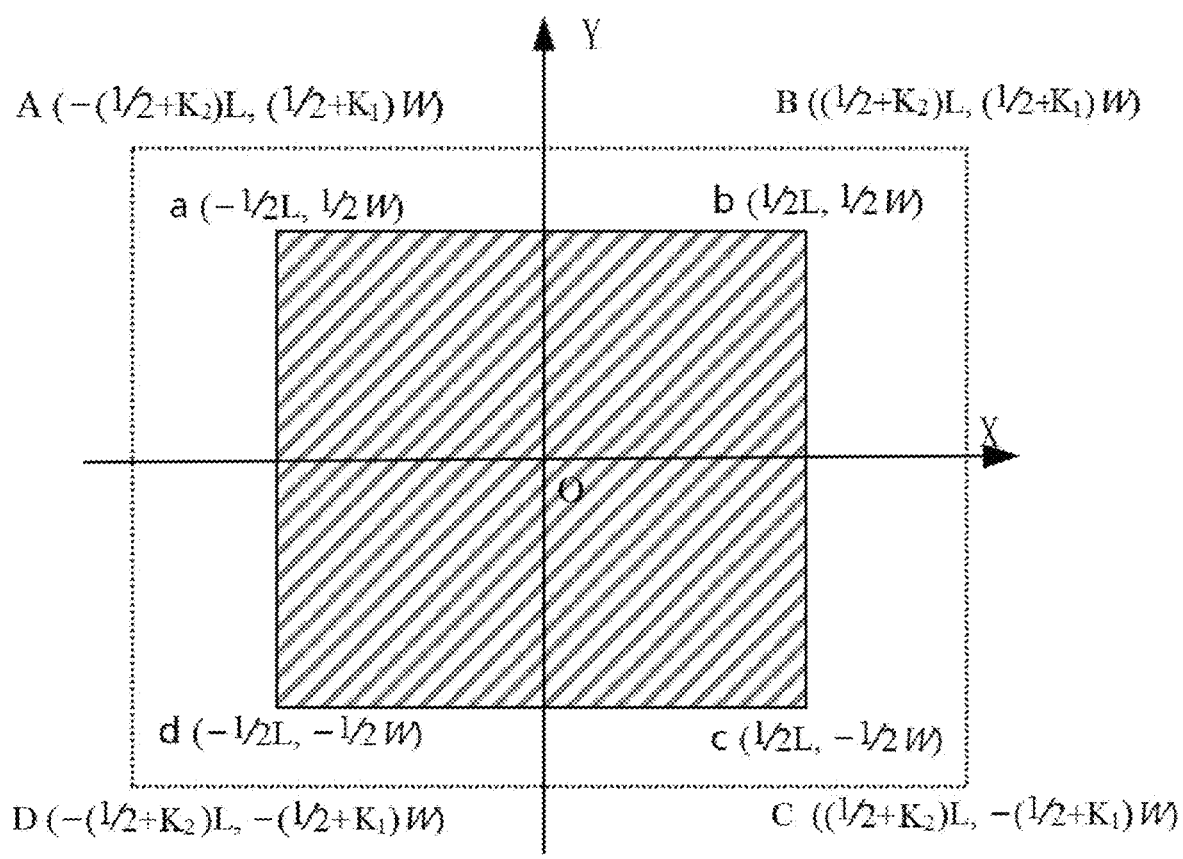
FIG. 3A to FIG. 3E illustrate schematic diagrams of offset positions of a rectangular light spot in accordance with an embodiment of the present disclosure.
Figure 3B:
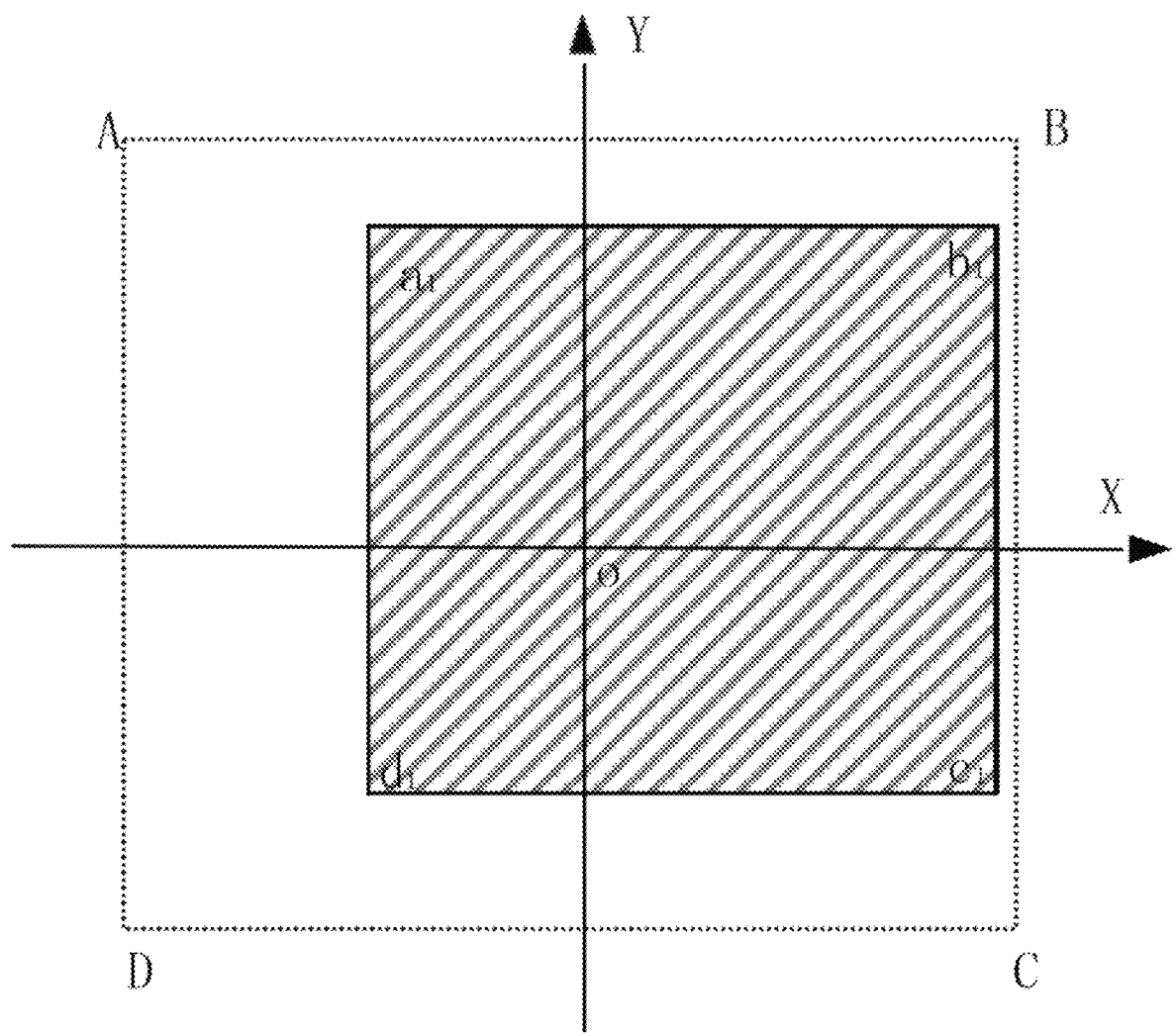
Figure 3C:
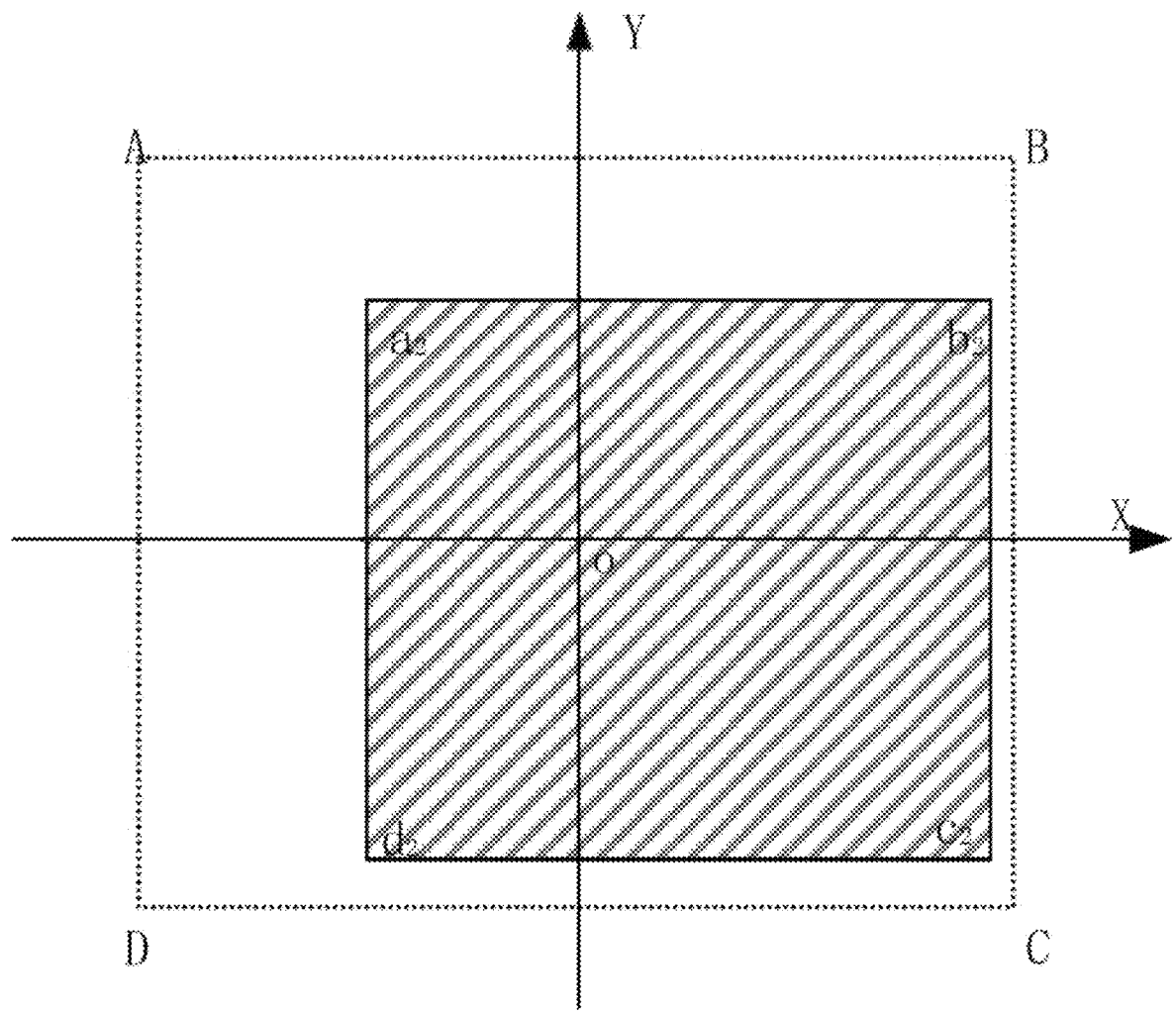
Figure 3D:
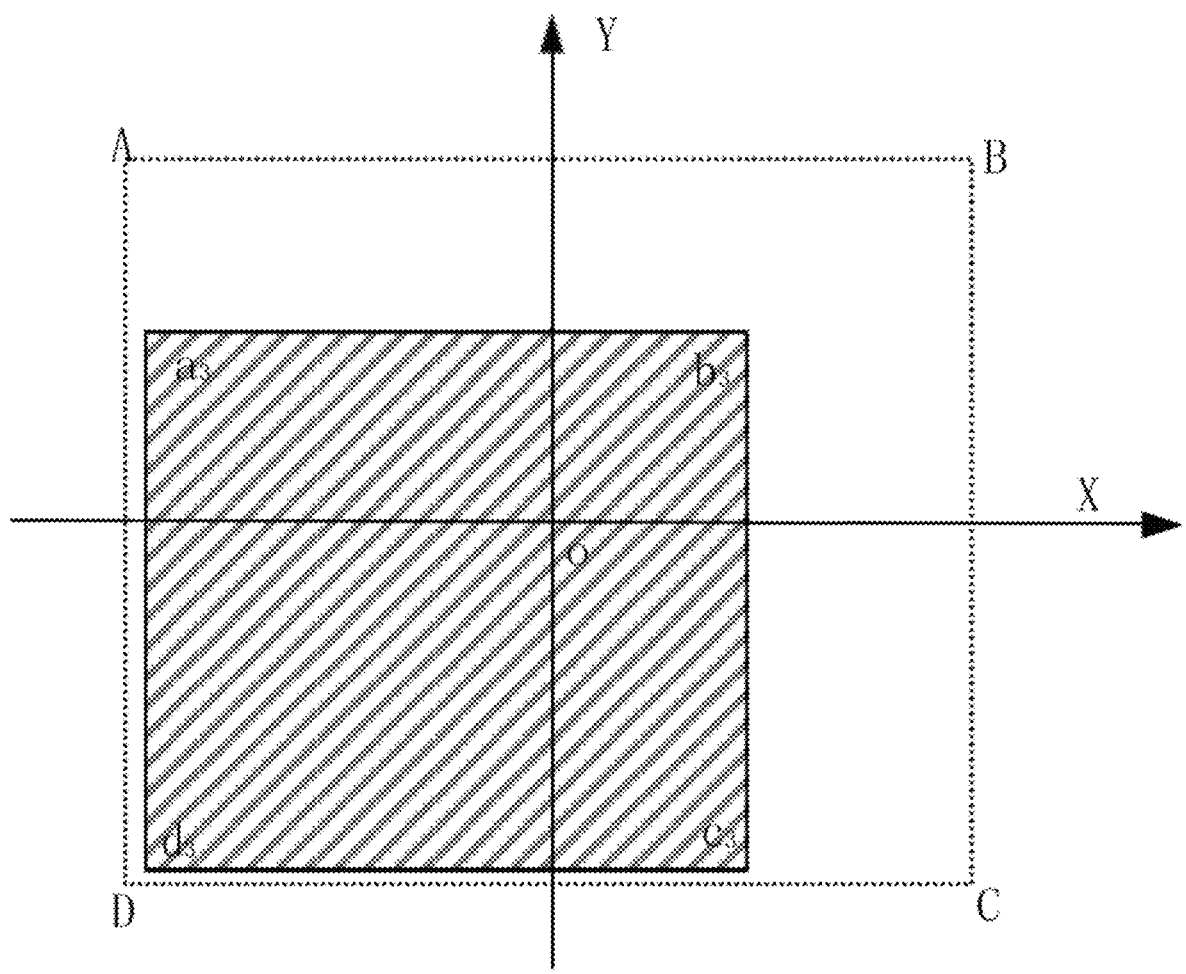
Figure 3E:
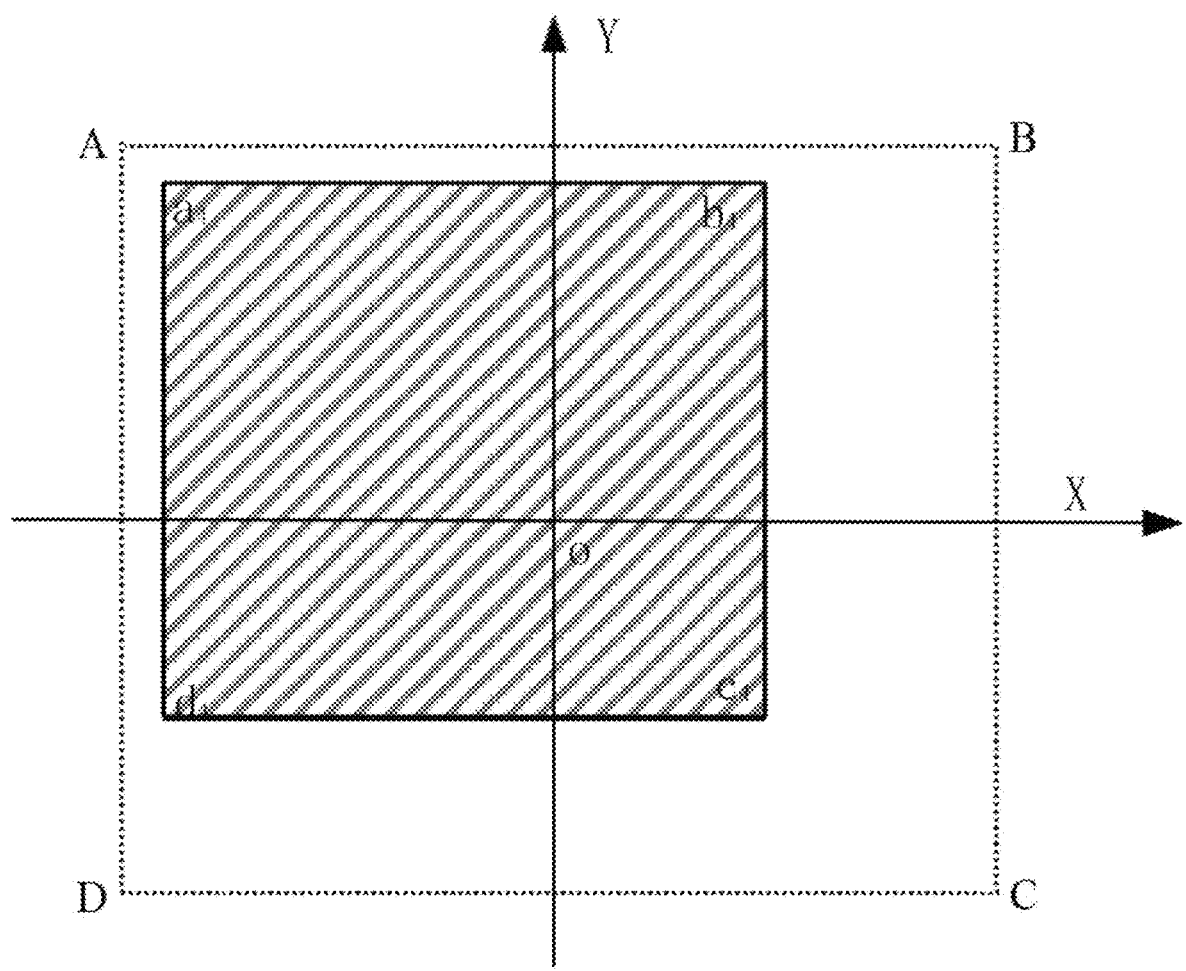

FIG. 3A illustrates a schematic ideal rectangular light spot abcd, at the moment, the rectangular light spot is free of offset, wherein the coordinate of a point a is $(-\frac{1}{2}L, \frac{1}{2}W)$, the coordinate of a point b is $(\frac{1}{2}L, \frac{1}{2}W)$, the coordinate of a point c is $(\frac{1}{2}L, -\frac{1}{2}W)$, and the coordinate of a point d is $(-\frac{1}{2}L, -\frac{1}{2}W)$. Correspondingly, FIG. 3B illustrates a rectangular light spot $a_1 b_1 c_1 d_1$ formed by the offset of the rectangular light spot towards a (+X,+Y) direction, FIG. 3C illustrates a rectangular light spot $a_2 b_2 c_2 d_2$ formed by the offset of the rectangular light spot towards a (+X,-Y) direction, FIG. 3D illustrates a rectangular light spot $a_3 b_3 c_3 d_3$ formed by the offset of the rectangular light spot towards a (-X,-Y) direction, and FIG. 3E illustrates a rectangular light spot $a_4 b_4 c_4 d_4$ formed by the offset of the rectangular light spot towards a (-X,+Y) direction.

In a possible embodiment, when a first preset condition is satisfied, wherein the first preset condition may be that the partially polarized light is partially circularly polarized light, the 3D light valve may be configured to at least include a square light valve MNPQ. After the rectangular light spot is offset, the 3D light valve is rotated around the central point by integral times of 90 degrees according to the offset position of the rectangular light spot such that the 3D light valve completely covers the current light spot range of the rectangular light spot, wherein a side length of the square light valve MNPQ is $\text{Max}[(\frac{1}{2}+K_2)L, (\frac{1}{2}+K_1)W]+\frac{1}{2}L$, one group of two adjacent sides of the square light valve MNPQ has a vertical distance of $\frac{1}{2}L$ from the central point, and another group of two adjacent sides of the square light valve MNPQ has a vertical distance of $\text{Max}[(\frac{1}{2}+K_2)L, (\frac{1}{2}+K_1)W]$ from the central point.

Wherein, the 3D light valve being configured to at least include the square light valve MNPQ means that the 3D light valve may be a light valve arbitrary extending circumferentially based on the square light valve MNPQ. In other words, the square light valve MNPQ is the smallest light valve.

Referring to FIG. 4A to FIG. 4E, as an example, $(\frac{1}{2}+K_2)L > (\frac{1}{2}+K_1)W$, and the 3D light valve is the smallest square light valve MNPQ, the situation that the 3D light valve is rotationally regulated according to an offset position of the partially polarized light to cover the current light spot range is illustratively described.

Figure 4A:
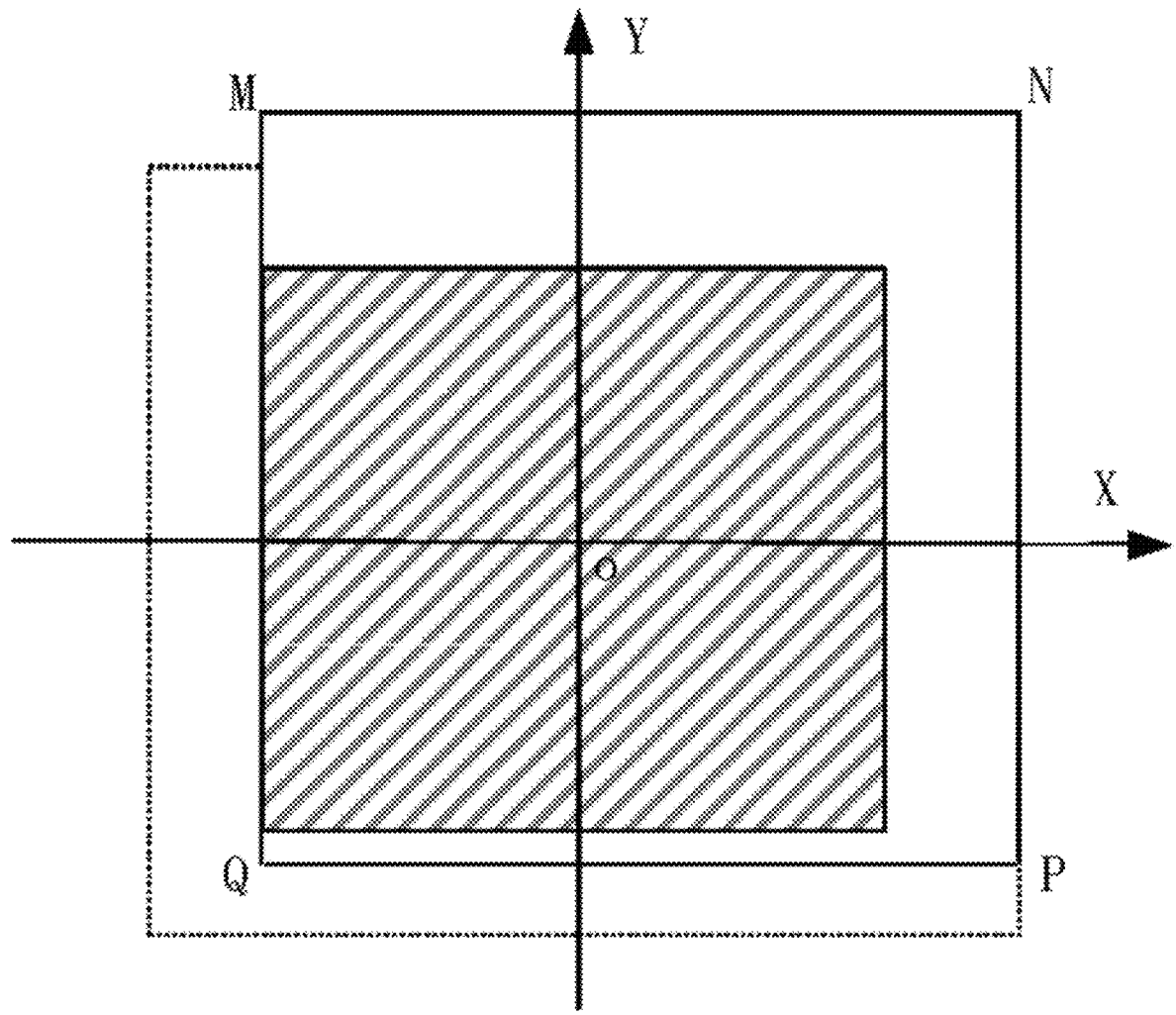
FIG. 4A to FIG. 4E illustrate schematic diagrams of a square light valve MNPQ in accordance with an embodiment of the present disclosure after being rotationally regulated according to the offset positions of the rectangular light spot shown in FIG. 3A to FIG. 3E.

Referring to FIG. 4A, when the current light spot range formed at the 3D light valve by the partially polarized light emitted by the lens assembly is the ideal rectangular light spot abcd shown in FIG. 3A, the square light valve MNPQ is located at the first position, wherein the current coordinate of a point Q may be $(-\frac{1}{2}L, -\frac{1}{2}L)$, the current coordinate of a point N may be $((\frac{1}{2}+K_2)L, (\frac{1}{2}+K_2)L)$, the current coordinate of a point M may be $(-\frac{1}{2}L, (\frac{1}{2}+K_2)L)$, and the current coordinate of a point P may be $((\frac{1}{2}+K_2)L, -\frac{1}{2}L)$. It can be known that the square light valve MNPQ shown in FIG. 4A may completely cover the ideal rectangular light spot abcd.

Figure 4B:
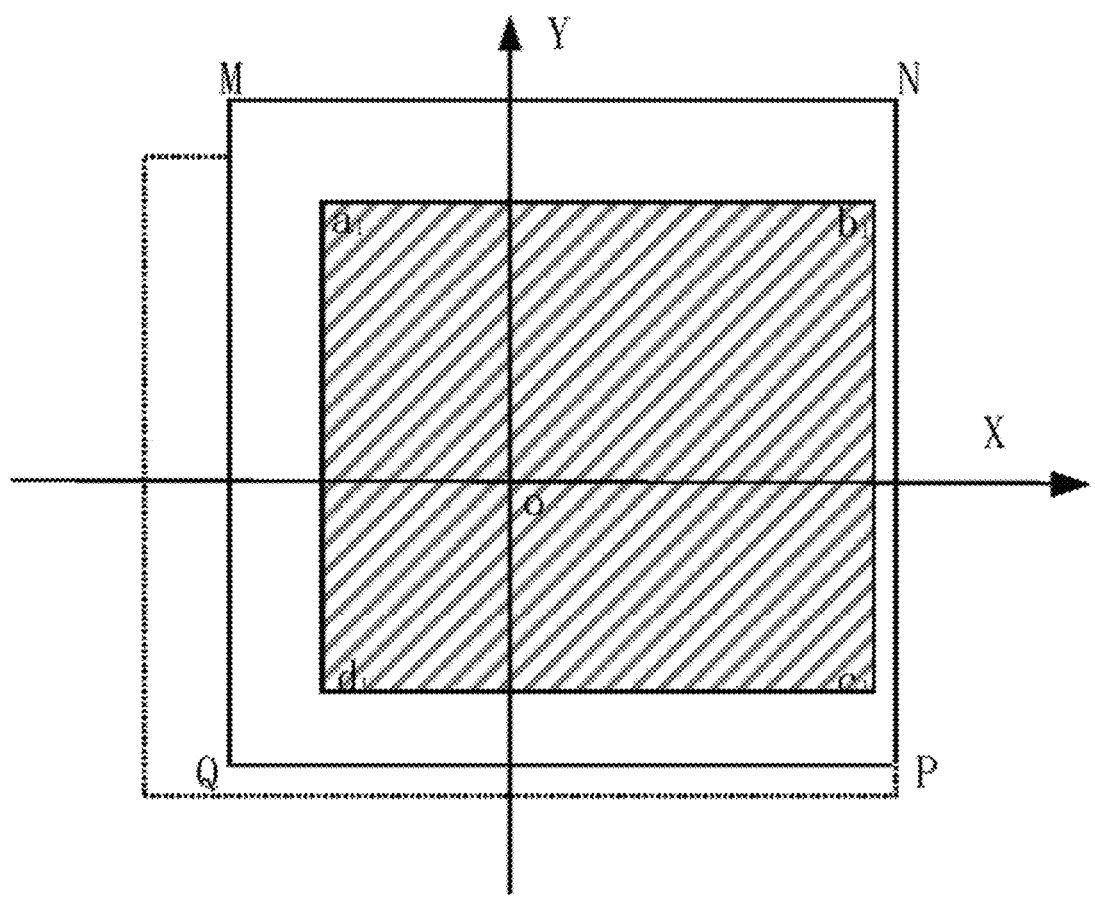

Referring to FIG. 4B, when the current light spot range formed at the 3D light valve by the partially polarized light emitted by the lens assembly is the offset rectangular light spot $a_1b_1c_1d_1$ shown in FIG. 3B, the square light valve MNPQ is still located at the first position, and the square light valve MNPQ at the first position shown in FIG. 4A still can completely cover the rectangular light spot $a_1b_1c_1d_1$.

Figure 4C:
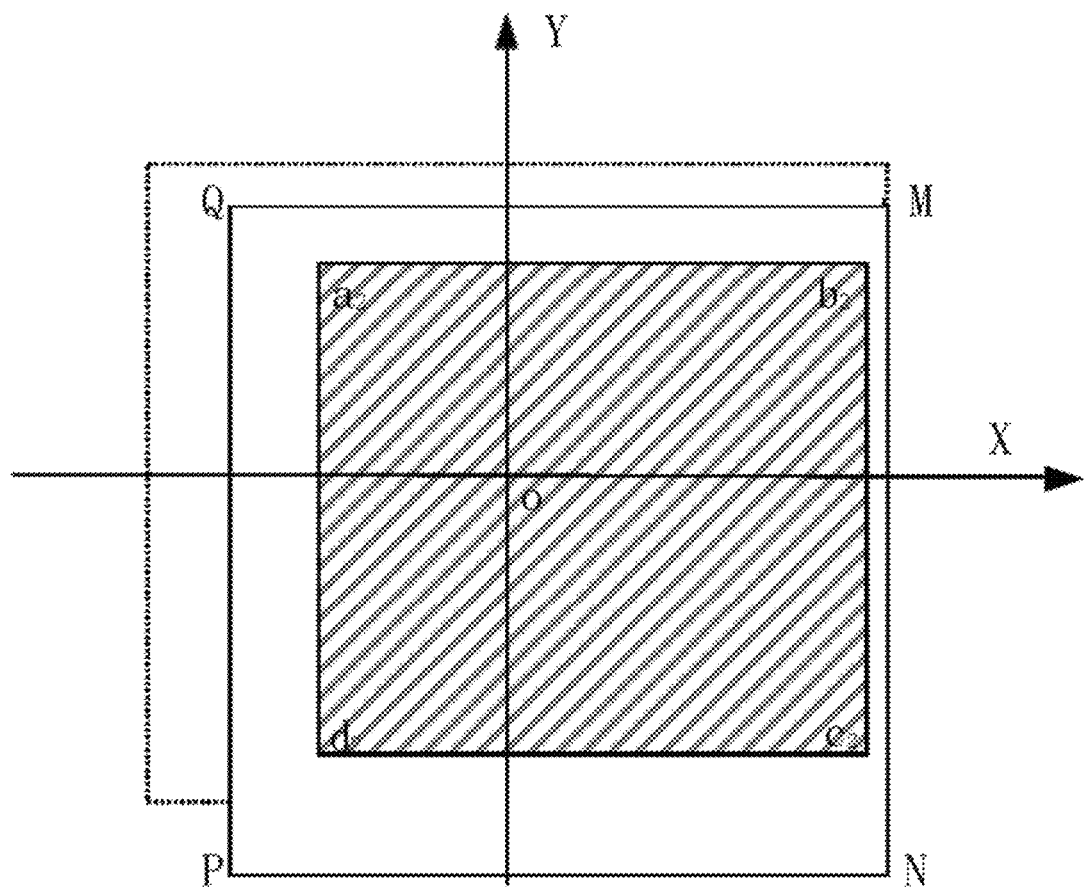

Referring to FIG. 4C, when the current light spot range formed at the 3D light valve by the partially polarized light emitted by the lens assembly is the offset rectangular light spot $a_2b_2c_2d_2$ shown in FIG. 3C, the square light valve MNPQ is clockwise rotated 90° around the central point O to the second position from the first position, at the moment, the current coordinate of a point Q may be $(-\frac{1}{2}L, \frac{1}{2}L)$, the current coordinate of a point N may be $((\frac{1}{2}+K_2)L, (\frac{1}{2}+K_2)L)$, the current coordinate of a point M may be $((\frac{1}{2}+K_2)L, -\frac{1}{2}L)$, and the current coordinate of a point P may be $(-\frac{1}{2}L, (\frac{1}{2}+K_2)L)$. It can be known that the square light valve MNPQ at the second position shown in FIG. 4C still can completely cover the offset rectangular light spot $a_2b_2c_2d_2$.

Figure 4D:
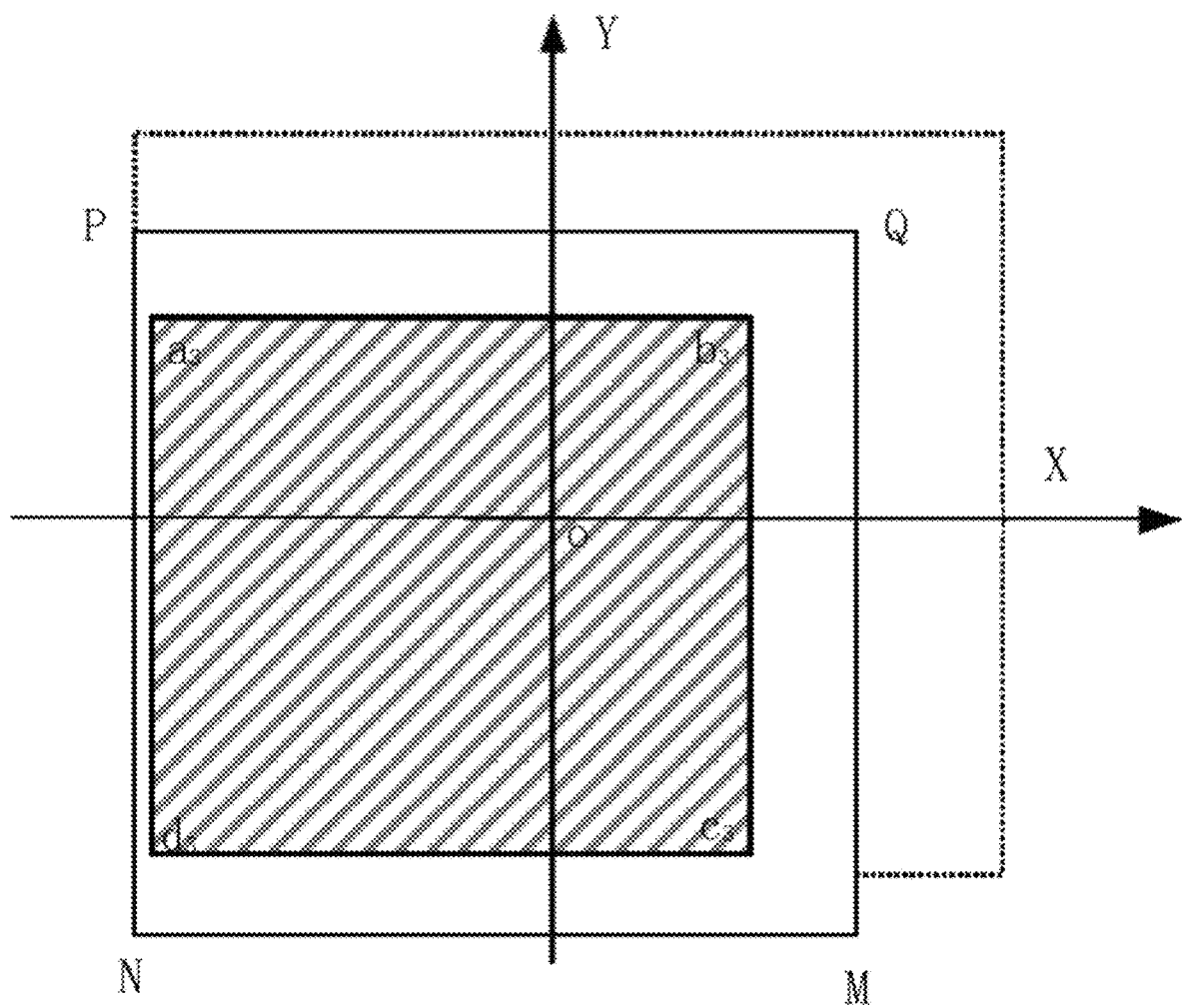

Referring to FIG. 4D, when the current light spot range formed at the 3D light valve by the partially polarized light emitted by the lens assembly is the offset rectangular light spot $a_3b_3c_3d_3$ shown in FIG. 3D, the square light valve MNPQ is clockwise rotated 90° around the central point O to the third position from the second position, at the moment, the current coordinate of the point Q may be $(\frac{1}{2}L, \frac{1}{2}L)$, the current coordinate of the point N may be $(-(\frac{1}{2}+K_2)L, (\frac{1}{2}+K_2)L)$, the current coordinate of the point M may be $((\frac{1}{2}+K_2)L, -\frac{1}{2}L)$, and the current coordinate of the point P may be $(-\frac{1}{2}L, (\frac{1}{2}+K_2)L)$. It can be known that the square light valve MNPQ at the third position shown in FIG. 4D still can completely cover the offset rectangular light spot $a_3b_3c_3d_3$.

Figure 4E:
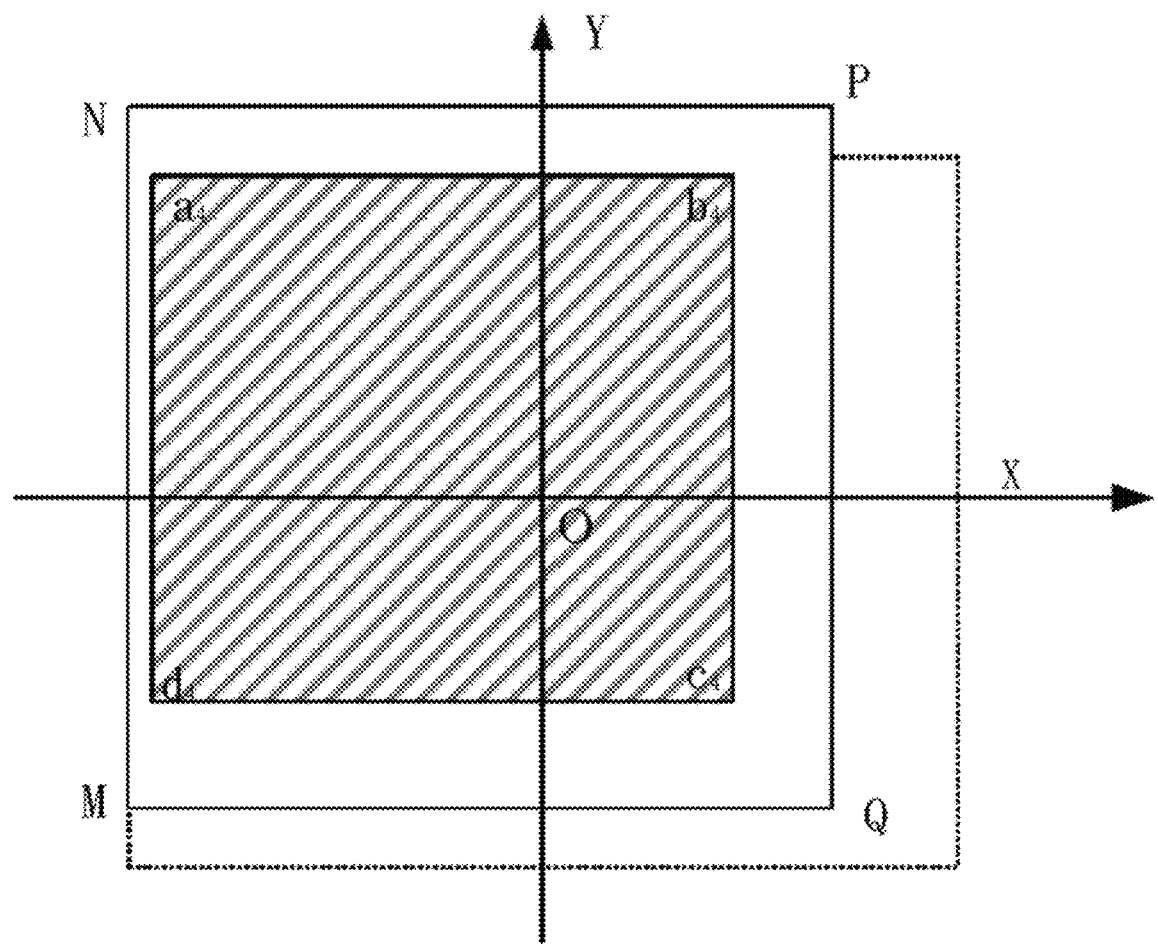

Referring to FIG. 4E, when the current light spot range formed at the 3D light valve by the partially polarized light emitted by the lens assembly is the offset rectangular light spot $a_4b_4c_4d_4$ shown in FIG. 3E, the square light valve MNPQ is clockwise rotated 90° around the central point O to the fourth position from the third position, at the moment, the current coordinate of the point Q may be $(\frac{1}{2}L, -\frac{1}{2}L)$, the current coordinate of the point N may be $(-(\frac{1}{2}+K_2)L, (\frac{1}{2}+K_2)L)$, the current coordinate of the point M may be $(-(\frac{1}{2}+K_2)L, -\frac{1}{2}L)$, and the current coordinate of the point P may be $(\frac{1}{2}L, (\frac{1}{2}+K_2)L)$. It can be known that the square light valve MNPQ at the fourth position shown in FIG. 4E still can completely cover the offset rectangular light spot $a_4b_4c_4d_4$.

In conclusion, the smallest 3D light valve including the square light valve MNPQ in this embodiment can be regulated with a rotation granularity of 90° to achieve the same function as the 3D light valve with the maximum offset range size, i.e., covering the left-right and up-down offset of the light spot, according to the light offset position and the rotational symmetry of the light valve, thus reducing the area of the light valve, reducing the weight of the light valve, and reducing the cost of the stereoscopic projection device.

In another possible embodiment, when a second preset condition is satisfied, wherein the second preset condition may be that the partially polarized light is partially circularly polarized light or partially linearly polarized light, the 3D light valve may be configured to at least include a rectangular light valve M'N'P'Q'. After the rectangular light spot is offset, the 3D light valve is rotated around the central point by integral times of 180 degrees according to the offset positions of the rectangular light spot such that the 3D light valve completely covers the current light spot range of the rectangular light spot.

In an embodiment, when $K_1 \geq K_2$, the rectangular light valve M'N'P'Q' has a length of $(1+2K_2)L$ and a width of $(1+K_1)W$, and a first long side and a second long side which are opposite to each other respectively have vertical distances of $\frac{1}{2}W$ and $(\frac{1}{2}+K_1)W$ from the central point, and a first short side and a second short side which are opposite to each other have a same vertical distance of $(\frac{1}{2}+K_2)L$ from the central point.

In another embodiment, when $K_1 \leq K_2$, the rectangular light valve M'N'P'Q' has a length of $(1+2K_1)W$ and a width of $(1+K_2)L$, and the first long side and the second long side which are opposite to each other respectively have vertical distances of $\frac{1}{2}L$ and $(\frac{1}{2}+K_2)L$ from the central point, and the first short side and the second short side which are opposite to each other have a same vertical distance of $(\frac{1}{2}+K_2)W$ from the central point. It may be understood that the rectangular light valve M'N'P'Q' when $K_1 \leq K_2$ is similar with the rectangular light valve M'N'P'Q' when $K_1 \geq K_2$ and will not be repeated here.

Figure 5A:
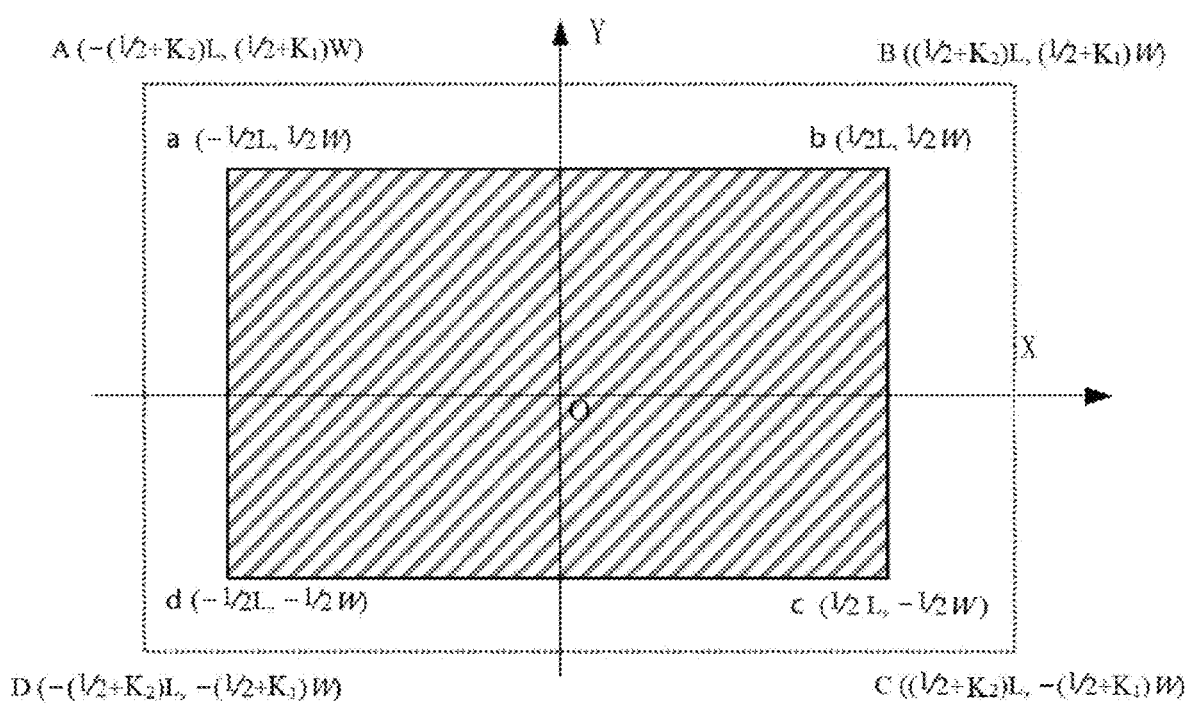
FIG. 5A to FIG. 5C illustrate schematic diagrams of a rectangular light valve M'N'P'Q' in accordance with an embodiment of the present disclosure after being rotationally regulated according to the offset positions of the rectangular light spot.
Figure 5B:
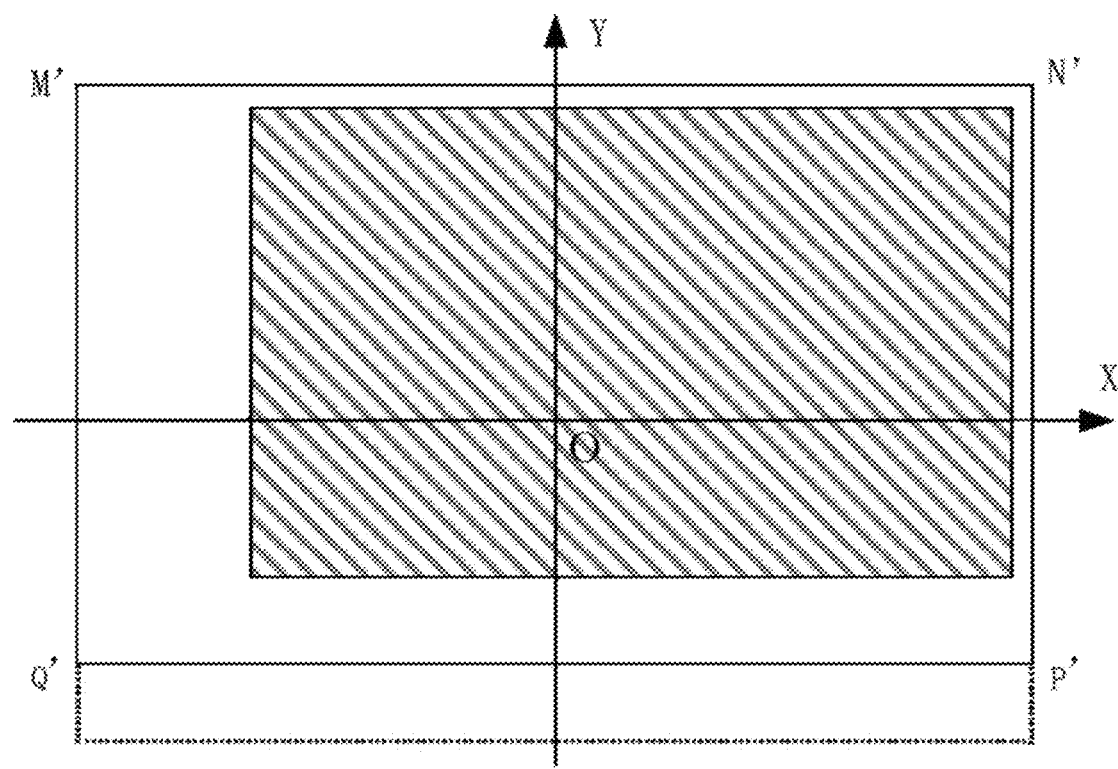
Figure 5C:
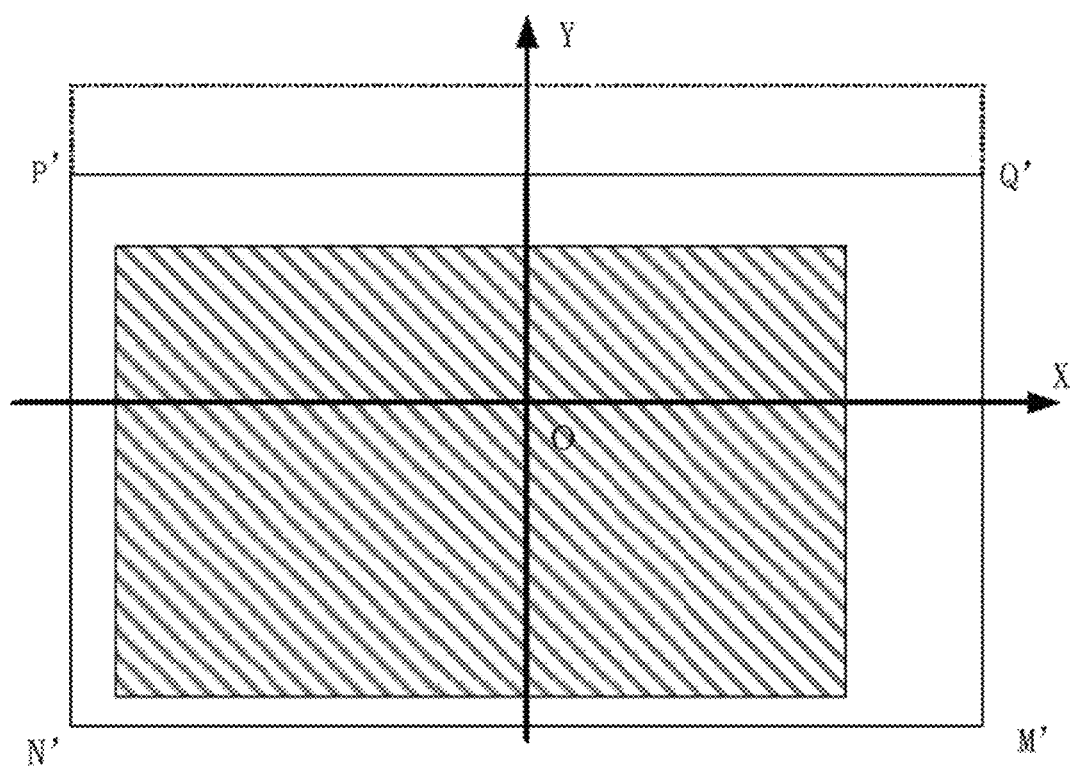

Referring to FIG. 5A to FIG. 5C, the situation that the rectangular light valve M'N'P'Q' is rotated around the central point by integral times of 180 degrees when $K_1 \geq K_2$ is described. In the maximum light spot offset range ABCD, the coordinate of a point A may be $(-(\frac{1}{2}+K_2)L, (\frac{1}{2}+K_1)W)$, the coordinate of a point B may be $((\frac{1}{2}+K_2)L, (\frac{1}{2}+K_1)W)$, the coordinate of a point C may be $((\frac{1}{2}+K_2)L, -(\frac{1}{2}+K_1)W)$, and the coordinate of a point D may be $(-(\frac{1}{2}+K_2)L, -(\frac{1}{2}+K_1)W)$.

FIG. 5A illustrates an ideal rectangular light spot abcd, at the moment, the rectangular light spot is free of offset, the coordinate of a point a is $(-\frac{1}{2}L, \frac{1}{2}W)$, the coordinate of a point b is $(\frac{1}{2}L, \frac{1}{2}W)$, the coordinate of a point c is $(\frac{1}{2}L, -\frac{1}{2}W)$, and the coordinate of a point d is $(-\frac{1}{2}L, -\frac{1}{2}W)$. FIG. 5B illustrates a rectangular light spot formed by the offset of the rectangular light spot towards a (+Y) direction, at the moment, the rectangular light valve M'N'P'Q' is located at the first position of the rectangular light spot, i.e., offset to the (+Y) direction. FIG. 5C illustrates another rectangular light spot formed by the offset of the rectangular light spot towards a (−Y) direction, at the moment, the rectangular light valve M'N'P'Q' is rotated 180 degrees around the central point to the second position from the first position, i.e., offset to the (−Y) direction. It can be known that the rectangular light valves M'N'P'Q' shown in FIG. 5A and FIG. 5B may completely cover the ideal rectangular light spot or the offset rectangular light spot.

In conclusion, the smallest 3D light valve including the rectangular light valve M'N'P'Q' in this embodiment can be regulated with a rotation granularity of 180° to achieve the same function as the 3D light valve with the maximum offset range size, i.e., covering the left-right and up-down offset of the light spot, according to the light offset position and the rotational symmetry of the light valve, thus reducing the area of the light valve, reducing the weight of the light valve, and reducing the cost of the stereoscopic projection device.

In a possible embodiment, the first preset condition above may include that the partially polarized light is partially circularly polarized light, and the area of the square light valve MNPQ is smaller than that of the rectangular light valve M'N'P'Q'. The second preset condition above may include that the partially polarized light is partially circularly polarized light or partially linearly polarized light, and the area of the square light valve MNPQ is greater than that of the rectangular light valve M'N'P'Q'. In other words, in a case of satisfying the condition, the smaller of the square light valve MNPQ and the rectangular light valve M'N'P'Q' is used as the smallest light valve of the 3D light valve.

In a possible embodiment, the polarization stereoscopic conversion equipment may further include a light spot detection device for detecting the current light spot range formed at the 3D light valve; and a rotating control device for controlling an angle of rotation of the 3D light valve in response to the detected current light spot range.

Wherein, the light spot detection device may be fabricated by using optical sensors, with the purpose of automatically detecting the current light spot range. The rotating control device specifically includes a control circuit, which is electrically connected to the light spot detection device to receive the detected current light spot range information and generate a control instruction according to the detected current light spot range information, and is electrically connected to a rotating mechanism of the 3D light valve so as to control the 3D light valve for rotational regulation according to the generated control instruction. Therefore, the regulation of the 3D light valve can be automatically achieved without manual operation, and a better use effect is achieved in comparison with the above embodiments.

In a possible embodiment, the light spot detection device described above specifically may be used to detect the position of the light spot central point formed at the 3D light valve by the partially polarized light in a reference coordinate system XOY, wherein an origin O in the reference coordinate system XOY is the central point, the X-axis is parallel to a length direction of the light spot, and the Y-axis is parallel to a width direction of the light spot.

Based on this, when the 3D light valve is configured to at least include a square light valve MNPQ, the rotating control device is configured to control the 3D light valve to rotate by integral times of 90 degrees according to the positions of the light spot central point in the reference coordinate system XOY, such that the central point of the square light valve MNPQ and the current light spot central point locate on the same quadrant of the reference coordinate system XOY. In accordance with the embodiment, the rotating control is performed by determining whether the central point of the square light valve MNPQ and the current light spot center are located at the same quadrant of the reference coordinate system XOY, the control logic is simpler and more intuitive, less computationally intensive and more accurate.

Based on this, when the 3D light valve is configured to at least include the rectangular light valve M'N'P'Q' and $K_1 \geq K_2$, the rotating control device is configured to control the 3D light valve to rotate by integral times of 180 degrees according to the positions of the light spot central point in the reference coordinate system XOY, such that the central point of the rectangular light valve M'N'P'Q' and the current light spot central point locate on the same side of the X-axis of the reference coordinate system XOY. In accordance with the embodiment, the rotating control is performed by determining whether the central point of the rectangular light valve M'N'P'Q' and the current light spot central point are located on the same side of the X-axis of the reference coordinate system XOY, the control logic is simpler and more intuitive, and less computationally intensive.

Based on this, when the 3D light valve is configured to at least include a rectangular light valve M'N'P'Q' and $K_1 \leq K_2$, the rotating control device is configured to control the 3D light valve to rotate by integral times of 180 degrees according to the positions of the light spot central point in the reference coordinate system XOY, such that the central point of the rectangular light valve M'N'P'Q' and the current light spot central point locate on the same side of the Y-axis of the reference coordinate system XOY. In accordance with the embodiment, the rotating control is performed by determining whether the central point of the rectangular light valve M'N'P'Q' and the current light spot central point are located on the same side of the Y-axis of the reference coordinate system XOY, complicated control logic is avoided, and the control logic is simpler and more intuitive, and less computationally intensive.

In a possible embodiment, the 3D light valve above is a single-optical-path light valve.

In a possible embodiment, the polarization stereoscopic conversion equipment further includes a light valve housing. The light valve housing is rotationally installed at a light-emitting end of the projector, the 3D light valve is fixedly arranged on the light valve housing and is rotationally regulated under the driving of the light valve housing. The light valve housing is provided with a plurality of installation fixing positions, and the light valve housing is configured to drive the 3D light valve to rotate to target angles through the plurality of installation fixing positions.

Figure 6:
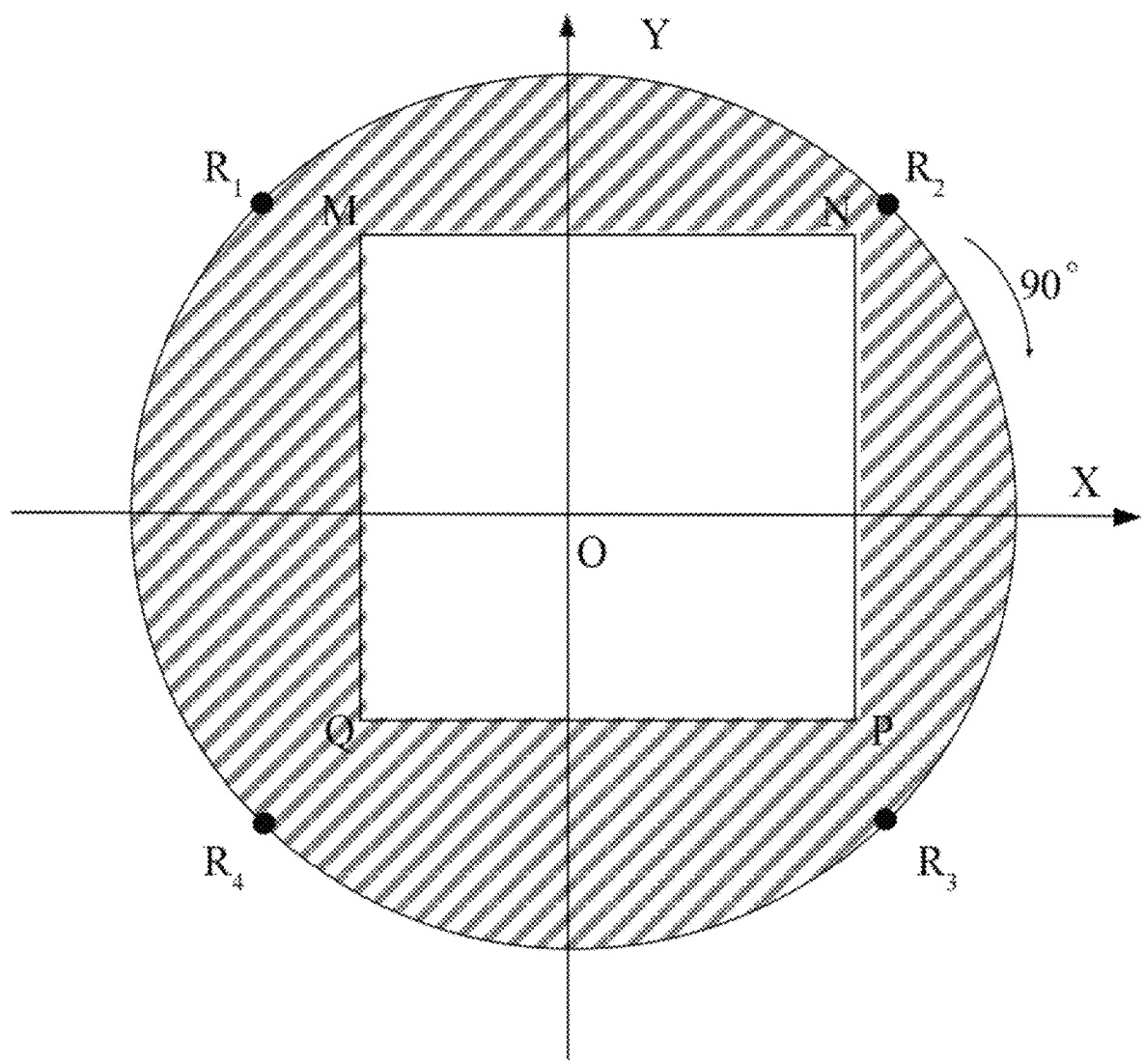
FIG. 6 illustrates a structure diagram of a light valve housing in accordance with an embodiment of the present disclosure.

Referring to FIG. 6, in an embodiment of the present disclosure, when the partially polarized light emitted by the projector is circularly polarized light, the projector outputs a rectangular light spot abcd having a length of L and a width of W, and the area of the square light valve MNPQ is smaller than that of the rectangular light valve M'N'P'Q', four installation fixing positions ($R_1$, $R_2$, $R_3$, $R_4$) are arranged at an edge of the round light valve housing, and different installation fixing positions are in rotational symmetry with respect to the central point O. It may be understood that the square light valve MNPQ may be rotated by integral times of 90 degrees under the driving of the round light valve housing, such that the central point of the square light valve MNPQ and the central point of the offset rectangular light spot are located on the same quadrant of the reference coordinate system XOY, and the square light valve MNPQ can cover the rectangular light spot abcd.

Figure 7:
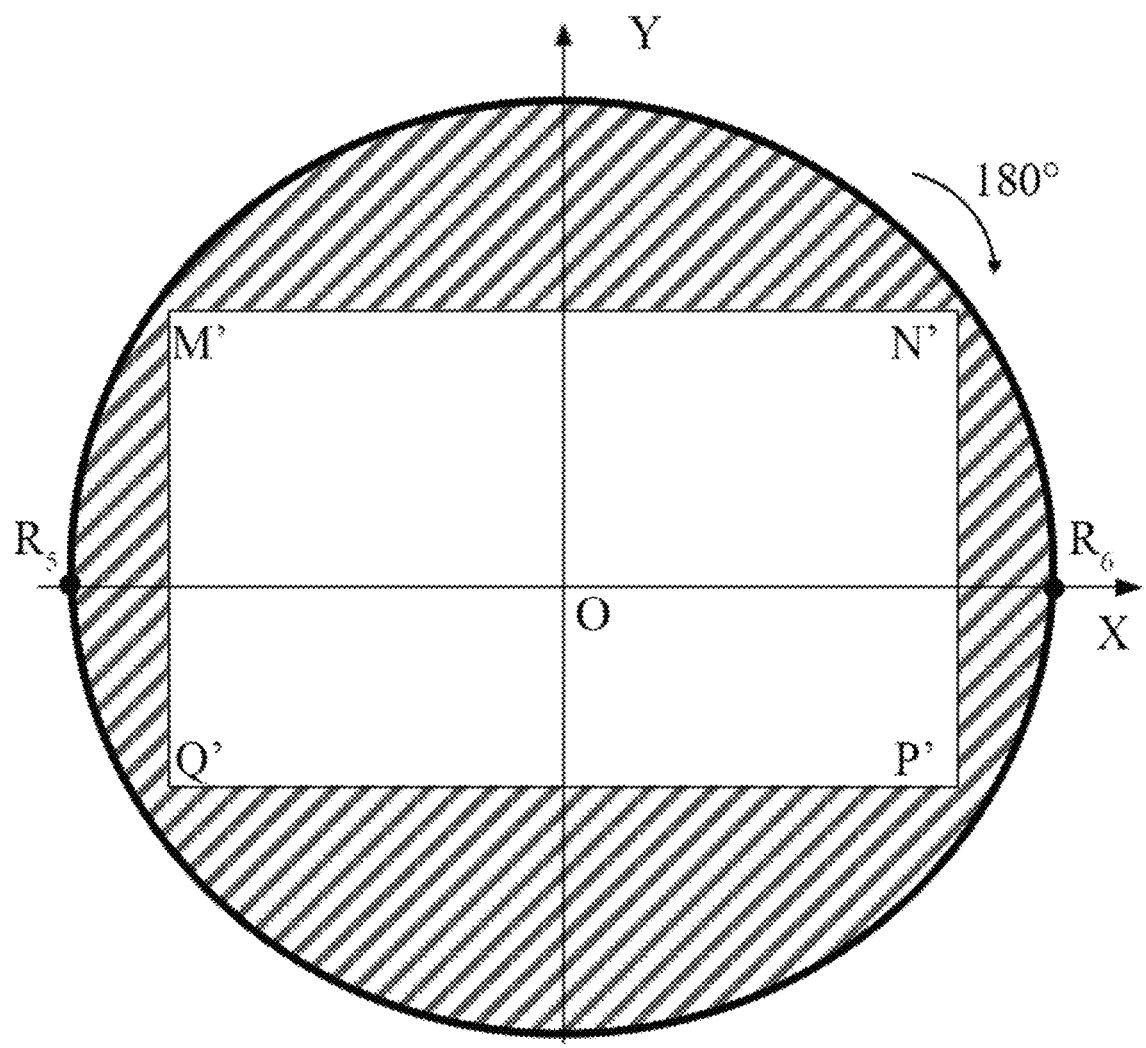
FIG. 7 illustrates a structure diagram of a light valve housing in accordance with another embodiment of the present disclosure.

Referring to FIG. 7, in another embodiment of the present disclosure, when the partially polarized light emitted by the projector is linearly polarized light, the projector outputs a rectangular light spot abcd having a length of L and a width of W, or the partially polarized light emitted by the projector is circularly polarized light, the projector outputs a rectangular light spot abcd having a length of L and a width of W, and the area of the square light valve MNPQ is greater than that of the rectangular light valve M'N'P'Q', two installation fixing positions ($R_5$, $R_6$) are arranged at an edge of the light valve housing, and the two installation fixing positions are in central symmetry with respect to the origin O of the reference coordinate system XOY; the rectangular light valve M'N'P'Q' may be rotated by integral times of 180 degrees under the driving of the round light valve housing so as to cover the rectangular light spot abcd. For example, when the rectangular light spot abcd is offset to the (−Y)

direction, installing holes of the light valve housing can be regulated to drive the rectangular light valve M'N'P'Q' to rotate by taking 180 degrees as the granularity, such that the rectangular light valve M'N'P'Q' to offset to the (−Y) direction to cover the rectangular light spot abcd.

In the embodiments of the present disclosure, the light valve is arranged on the light valve housing and can be driven by the light valve housing to rotate according to the emitting light and rotational symmetry characteristics of the light valve so as to achieve the same function as a light valve with an area several times than the light valve provided by the present discourse, thereby reducing the area of the light valve, reducing the weight of the light valve, and reducing the cost of the stereoscopic projection device.

While the spirit and principles of this invention have been described with reference to several specific embodiments, it should be understood that the present disclosure is not limited to the embodiments disclosed, and the division of various aspects does not mean that the features of these aspects cannot be combined to benefit, and the division is only for convenience of description. The present disclosure is intended to embrace various modifications and equivalent arrangements within the spirit and scope of the appended claims.

What is claimed is:

1. A stereoscopic projection device, comprising:
    a projector comprising a lens assembly for emitting partially polarized light with a high polarization degree;
    a polarization stereoscopic conversion equipment comprising a 3D light valve, wherein the 3D light valve is rotationally installed on a light-emitting side of the lens assembly and is parallel to the lens assembly, such that the partially polarized light passes through the 3D light valve to be converted into left hand circularly polarized light and right hand circularly polarized light;
    wherein when the partially polarized light emitted by the lens assembly is subjected to light spot offset, the 3D light valve is rotationally regulated according to an offset position and polarization characteristics of the partially polarized light, such that the 3D light valve covers a current light spot range formed at the 3D light valve by the partially polarized light.

2. The stereoscopic projection device according to claim 1, wherein
    the partially polarized light emitted by the lens assembly forms a rectangular light spot having a length of L and a width of W at the 3D light valve, an offset range of the rectangular light spot is $\pm K_1 W$ in a width direction and $\pm K_2 L$ in a length direction, wherein $K_1$ is a width displacement coefficient, and $K_2$ is a length displacement coefficient; and
    a central zero-degree light of the lens assembly forms a central point at the 3D light valve, and the 3D light valve is rotated around the central point such that the 3D light valve covers a current light spot range of the rectangular light spot.

3. The stereoscopic projection device according to claim 2, wherein
    if a first preset condition is satisfied, the 3D light valve is configured to at least comprise a square light valve MNPQ;
    when the rectangular light spot is offset, the 3D light valve is rotated around the central point by integral times of 90 degrees according to an offset position of the rectangular light spot such that the 3D light valve completely covers the current light spot range of the rectangular light spot;
    wherein a side length of the square light valve MNPQ is $\text{Max}[(½+K_2)L, (½+K_1)W]+½L$, one group of two adjacent sides of the square light valve MNPQ has a vertical distance of $½L$ from the central point, and another group of two adjacent sides of the square light valve MNPQ has a vertical distance of $\text{Max}[(½+\vec{K_2})L, (½+K_1)W]$ from the central point.

4. The stereoscopic projection device according to claim 3, wherein
    if a second preset condition is satisfied, the 3D light valve is configured to at least comprise a rectangular light valve M'N'P'Q';
    when the rectangular light spot is offset, the 3D light valve is rotated around the central point by integral times of 180 degrees according to the offset position of the rectangular light spot such that the 3D light valve completely covers the current light spot range of the rectangular light spot.

5. The stereoscopic projection device according to claim 4, wherein when $K_1 > K_2$, the rectangular light valve M'N'P'Q' has a length of $(1+2K_2)L$ and a width of $(1+K_1)W$, and a first long side and a second long side which are opposite to each other respectively have vertical distances of $½W$ and $(½+K_1)W$ from the central point, and a first short side and a second short side which are opposite to each other have a same vertical distance from the central point.

6. The stereoscopic projection device according to claim 4 or 5, wherein
    when $K_1 \le K_2$, the rectangular light valve M'N'P'Q' has a length of $(1+2K_1)W$ and a width of $(1+K_2)L$, and the first long side and the second long side which are opposite to each other respectively have vertical distances of $½L$ and $(½+K_2)L$ from the central point, and the first short side and the second short side which are opposite to each other have a same vertical distance from the central point.

7. The stereoscopic projection device according to claim 4, wherein
    the first preset condition comprises: the partially polarized light is partially circularly polarized light, and an area of the square light valve MNPQ is smaller than that of the rectangular light valve M'N'P'Q';
    the second preset condition comprises: the partially polarized light is partially circularly polarized light or partially linearly polarized light, and the area of the square light valve MNPQ is greater than that of the rectangular light valve M'N'P'Q'.

8. The stereoscopic projection device according to claim 2, wherein the polarization stereoscopic conversion equipment further comprises:
    a light spot detection device for detecting the current light spot range formed at the 3D light valve by the partially polarized light; and
    a rotating control device for controlling an angle of rotation of the 3D light valve in response to the detected current light spot range.

9. The stereoscopic projection device according to claim 8, wherein the light spot detection device is configured to detect a position of a light spot central point formed at the 3D light valve by the partially polarized light in a reference coordinate system XOY, wherein an origin O of the reference coordinate system XOY is the central point, an X-axis is parallel to a length direction of the light spot, and a Y-axis is parallel to a width direction of the light spot.

10. The stereoscopic projection device according to claim 9, wherein when the 3D light valve is configured to at least comprise the square light valve MNPQ, the rotating control device is configured to control the 3D light valve to rotate by integral times of 90 degrees according to the position of the light spot central point in the reference coordinate system XOY, such that a central point of the square light valve MNPQ and a current light spot central point locate on a same quadrant of the reference coordinate system XOY.

11. The stereoscopic projection device according to claim 9, wherein
when the 3D light valve is configured to at least comprise the rectangular light valve M'N'P'Q' and $K_1 \geq K_2$, the rotating control device is configured to control the 3D light valve to rotate by integral times of 180 degrees according to the position of the light spot central point in the reference coordinate system XOY, such that the central point of the rectangular light valve M'N'P'Q' and the current light spot central point locate on a same side of the X-axis of the reference coordinate system XOY.

12. The stereoscopic projection device according to claim 9, wherein
when the 3D light valve is configured to at least comprise the rectangular light valve M'N'P'Q' and $K_1 \leq K_2$, the rotating control device is configured to control the 3D light valve to rotate by integral times of 180 degrees according to the position of the light spot central point in the reference coordinate system XOY, such that the central point of the rectangular light valve M'N'P'Q' and the current light spot central point locate on a same side of the Y axis of the reference coordinate system XOY.

13. The stereoscopic projection device according to claim 1, wherein the 3D light valve is a single-optical-path light valve.

14. The stereoscopic projection device according to claim 1, wherein the polarization stereoscopic conversion equipment further comprises:
a light valve housing rotationally installed at a light-emitting end of the projector, the 3D light valve is fixedly arranged on the light valve housing and is rotationally regulated under driving of the light valve housing;
wherein the light valve housing is provided with a plurality of installation fixing positions, and the light valve housing is configured to drive the 3D light valve to rotate to corresponding angles through the plurality of installation fixing positions.

15. The stereoscopic projection device according to claim 5, wherein
when $K_1 \leq K_2$, the rectangular light valve M'N'P'Q' has a length of $(1+2K_1)W$ and a width of $(1+K_2)L$, and the first long side and the second long side which are opposite to each other respectively have vertical distances of ½L and $(½+K_2)L$ from the central point, and the first short side and the second short side which are opposite to each other have a same vertical distance from the central point.

16. The stereoscopic projection device according to claim 5, wherein
the first preset condition comprises: the partially polarized light is partially circularly polarized light, and an area of the square light valve MNPQ is smaller than that of the rectangular light valve M'N'P'Q';
the second preset condition comprises: the partially polarized light is partially circularly polarized light or partially linearly polarized light, and the area of the square light valve MNPQ is greater than that of the rectangular light valve M'N'P'Q'.

17. The stereoscopic projection device according to claim 6, wherein
the first preset condition comprises: the partially polarized light is partially circularly polarized light, and an area of the square light valve MNPQ is smaller than that of the rectangular light valve M'N'P'Q';
the second preset condition comprises: the partially polarized light is partially circularly polarized light or partially linearly polarized light, and the area of the square light valve MNPQ is greater than that of the rectangular light valve M'N'P'Q'.

18. The stereoscopic projection device according to claim 10, wherein
when the 3D light valve is configured to at least comprise the rectangular light valve M'N'P'Q' and $K_1 \geq K_2$, the rotating control device is configured to control the 3D light valve to rotate by integral times of 180 degrees according to the position of the light spot central point in the reference coordinate system XOY, such that the central point of the rectangular light valve M'N'P'Q' and the current light spot central point locate on a same side of the X-axis of the reference coordinate system XOY.

19. The stereoscopic projection device according to claim 10, wherein
when the 3D light valve is configured to at least comprise the rectangular light valve M'N'P'Q' and $K_1 \leq K_2$, the rotating control device is configured to control the 3D light valve to rotate by integral times of 180 degrees according to the position of the light spot central point in the reference coordinate system XOY, such that the central point of the rectangular light valve M'N'P'Q' and the current light spot central point locate on a same side of the Y axis of the reference coordinate system XOY.

20. The stereoscopic projection device according to claim 11, wherein
when the 3D light valve is configured to at least comprise the rectangular light valve M'N'P'Q' and $K_1 \leq K_2$, the rotating control device is configured to control the 3D light valve to rotate by integral times of 180 degrees according to the position of the light spot central point in the reference coordinate system XOY, such that the central point of the rectangular light valve M'N'P'Q' and the current light spot central point locate on a same side of the Y axis of the reference coordinate system XOY.

* * * * *